United States Patent
Mars et al.

(10) Patent No.: US 10,296,848 B1
(45) Date of Patent: May 21, 2019

(54) SYSTEMS AND METHOD FOR AUTOMATICALLY CONFIGURING MACHINE LEARNING MODELS

(71) Applicant: Clinc, Inc., Ann Arbor, MI (US)

(72) Inventors: Jason Mars, Ann Arbor, MI (US); Lingjia Tang, Ann Arbor, MI (US); Michael Laurenzano, Ann Arbor, MI (US); Johann Hauswald, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 15/911,491

(22) Filed: Mar. 5, 2018

(51) Int. Cl.
*G06K 9/62* (2006.01)
*G06N 20/00* (2019.01)

(52) U.S. Cl.
CPC ........... *G06N 20/00* (2019.01); *G06K 9/6256* (2013.01); *G06K 9/6267* (2013.01)

(58) Field of Classification Search
CPC ..... G06K 9/6256; G06K 9/6267; G06F 15/18
See application file for complete search history.

(56) References Cited

U.S. PATENT DOCUMENTS

| | | | |
|---|---|---|---|
| 5,727,950 A | 3/1998 | Cook et al. | |
| 6,456,991 B1 | 9/2002 | Srinivasa et al. | |
| 7,792,353 B2 * | 9/2010 | Forman | G06N 20/00 382/159 |
| 8,140,450 B2 * | 3/2012 | Porikli | G06N 20/00 706/12 |
| 2004/0128624 A1 | 7/2004 | Arellano et al. | |
| 2006/0166174 A1 | 7/2006 | Rowe et al. | |
| 2007/0038609 A1 | 2/2007 | Wu | |
| 2007/0185896 A1 | 8/2007 | Jagannath et al. | |
| 2009/0030800 A1 | 1/2009 | Grois | |
| 2009/0204386 A1 | 8/2009 | Seligman et al. | |

(Continued)

FOREIGN PATENT DOCUMENTS

| | | |
|---|---|---|
| WO | 2015192239 A1 | 12/2015 |
| WO | 2017184587 A1 | 10/2017 |

OTHER PUBLICATIONS

Deng, L., & Platt, J. C. (2014). Ensemble deep learning for speech recognition. In Fifteenth Annual Conference of the International Speech Communication Association. (Year: 2014).*

Zhang, X. L., & Wang, D. (2016). Boosting contextual information for deep neural network based voice activity detection. IEEE/ACM Transactions on Audio, Speech and Language Processing (TASLP), 24(2), 252-264. (Year: 2016).*

(Continued)

*Primary Examiner* — Scott A. Waldron
*Assistant Examiner* — Oluwatosin O Alabi
(74) *Attorney, Agent, or Firm* — Jeffrey Schox; Padowithz Alce

(57) ABSTRACT

Systems and methods for intelligently training a machine learning model includes: configuring a machine learning (ML) training data request for a pre-existing machine learning classification model; transmitting the machine learning training data request to each of a plurality of external training data sources, wherein each of the plurality of external training data sources is different; collecting and storing the machine learning training data from each of the plurality of external training data sources; processing the collected machine learning training data using a predefined training data processing algorithm; and in response to processing the collected machine learning training data, deploying a subset of the collected machine learning training data into a live machine learning model.

13 Claims, 3 Drawing Sheets

(56) References Cited

U.S. PATENT DOCUMENTS

| | | |
|---|---|---|
| 2010/0121808 A1 | 5/2010 | Kuhn |
| 2011/0231182 A1 | 9/2011 | Weider et al. |
| 2013/0185074 A1 | 7/2013 | Gruber et al. |
| 2013/0288222 A1 | 10/2013 | Stacy et al. |
| 2015/0286955 A1 | 10/2015 | Virkar et al. |
| 2015/0310858 A1 | 10/2015 | Li et al. |
| 2015/0382047 A1 | 12/2015 | Van Os et al. |
| 2016/0019469 A1* | 1/2016 | Petrov ............... G06F 9/46 706/12 |
| 2016/0063389 A1* | 3/2016 | Fuchs ............... G06N 7/005 706/12 |
| 2016/0070992 A1 | 3/2016 | Fujii |
| 2017/0124487 A1 | 5/2017 | Szeto et al. |
| 2017/0300831 A1* | 10/2017 | Gelfenbeyn ........ G06N 3/006 |
| 2018/0047388 A1* | 2/2018 | Tyagi ............... G06N 3/08 |

OTHER PUBLICATIONS

Zhang, X. L., & Wu, J. (2013). Deep belief networks based voice activity detection. IEEE Transactions on Audio, Speech, and Language Processing, 21(4), 697-710. (Year: 2013).*

Kinnunen, T., Karpov, E., & Franti, P. (2006). Real-time speaker identification and verification. IEEE Transactions on Audio, Speech, and Language Processing, 14(1), 277-288. (Year: 2006).*

John, G. H., Kohavi, R., & Pfleger, K. (1994). Irrelevant features and the subset selection problem. In Machine Learning Proceedings 1994 (pp. 121-129). (Year: 1994).*

Lin, S. W., Ying, K. C., Chen, S. C., & Lee, Z. J. (2008). Particle swarm optimization for parameter determination and feature selection of support vector machines. Expert systems with applications, 35(4), 1817-1824. (Year: 2008).*

International Search Report and Written Opinion for PCT Application No. PCT/US18/20857 dated Apr. 24, 2018.

* cited by examiner

Implementing a ML Management Console S210

Receiving a ML Configuration Request S220

Transmitting ML Configuration Request S230

Collecting ML Training Data S240

Processing ML Training Data S250

Deploying the ML Training Data S260

FIGURE 2

SYSTEMS AND METHOD FOR AUTOMATICALLY CONFIGURING MACHINE LEARNING MODELS

GOVERNMENT RIGHTS

The subject matter of the invention may be subject to U.S. Government Rights under National Science Foundation grant: NSF SBIR Phase 1 Grant—1622049.

TECHNICAL FIELD

The inventions herein relate generally to the machine learning field, and more specifically to a new and useful system and method for intelligently training machine learning models in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF DESCRIPTION OF THE FIGURES

FIG. 2 illustrates an example method in accordance with one or more embodiments of the present application.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly-defined intents. This inflexible structure cannot reasonably and efficiently address the many variances in the manners in which a user may pose a query or command to the virtual assistant.

The embodiments of the present application, however, provide artificial intelligence virtual assistant platform and natural language processing capabilities that function to process and comprehend structured and/or unstructured natural language input from a user. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly-defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, a machine learning model configuration and management console of one or more embodiments of the present application enable a rapid and efficient training of machine learning models employed in the artificially intelligent virtual assistant.

Figure 1:
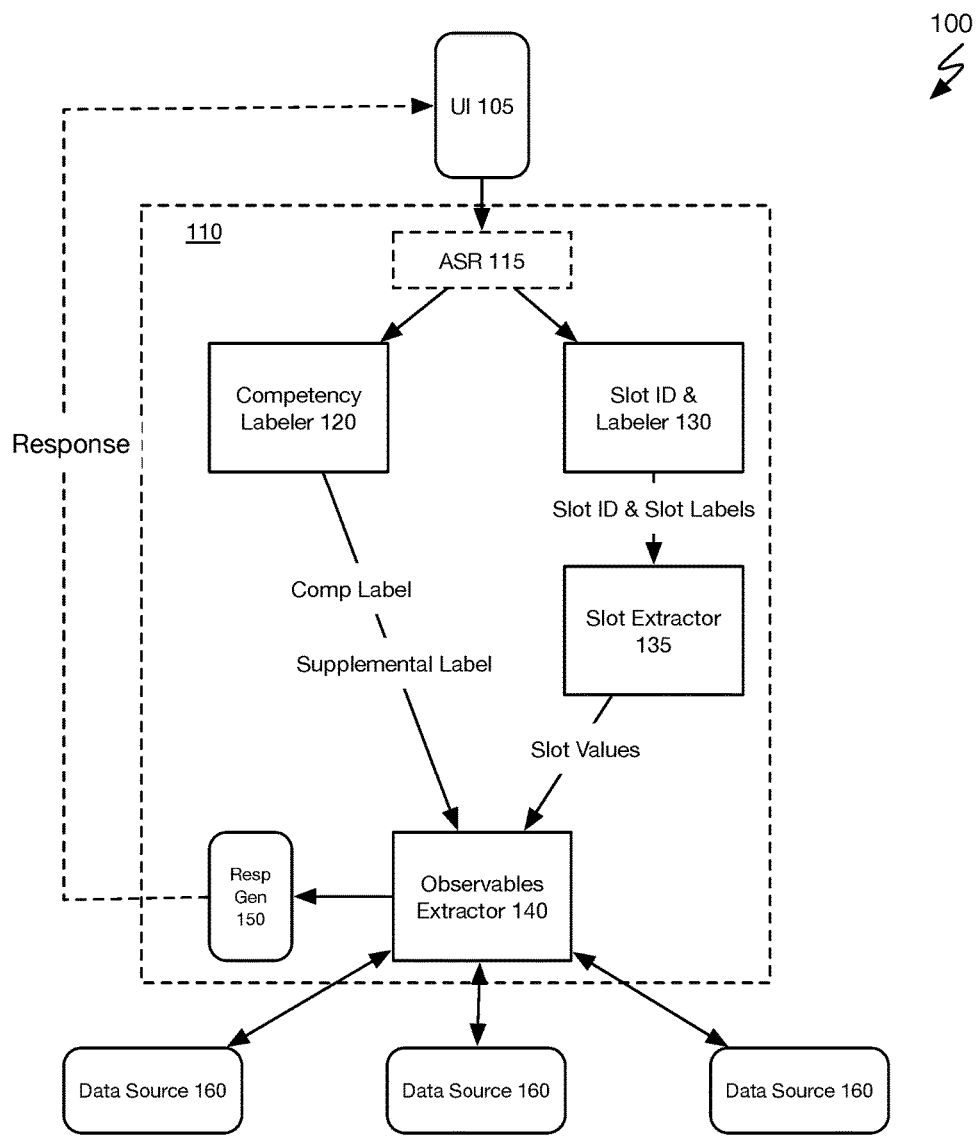
FIG. 1 illustrates a schematic representation of a system 100 in accordance with one or more embodiments of the present application.

1. System for Intelligently Training and/or Configuring a Machine Learning Model Using Crowdsourced Training Data As shown in FIG. 1, a system 100 that automatically trains and/or configures machine learning models includes an artificial intelligence (AI) virtual assistant platform 110, an machine learning configuration interface 120, a training/configuration data repository 130, a configuration data queue 135, and a plurality of external training/configuration data sources 140.

Figure 1A:
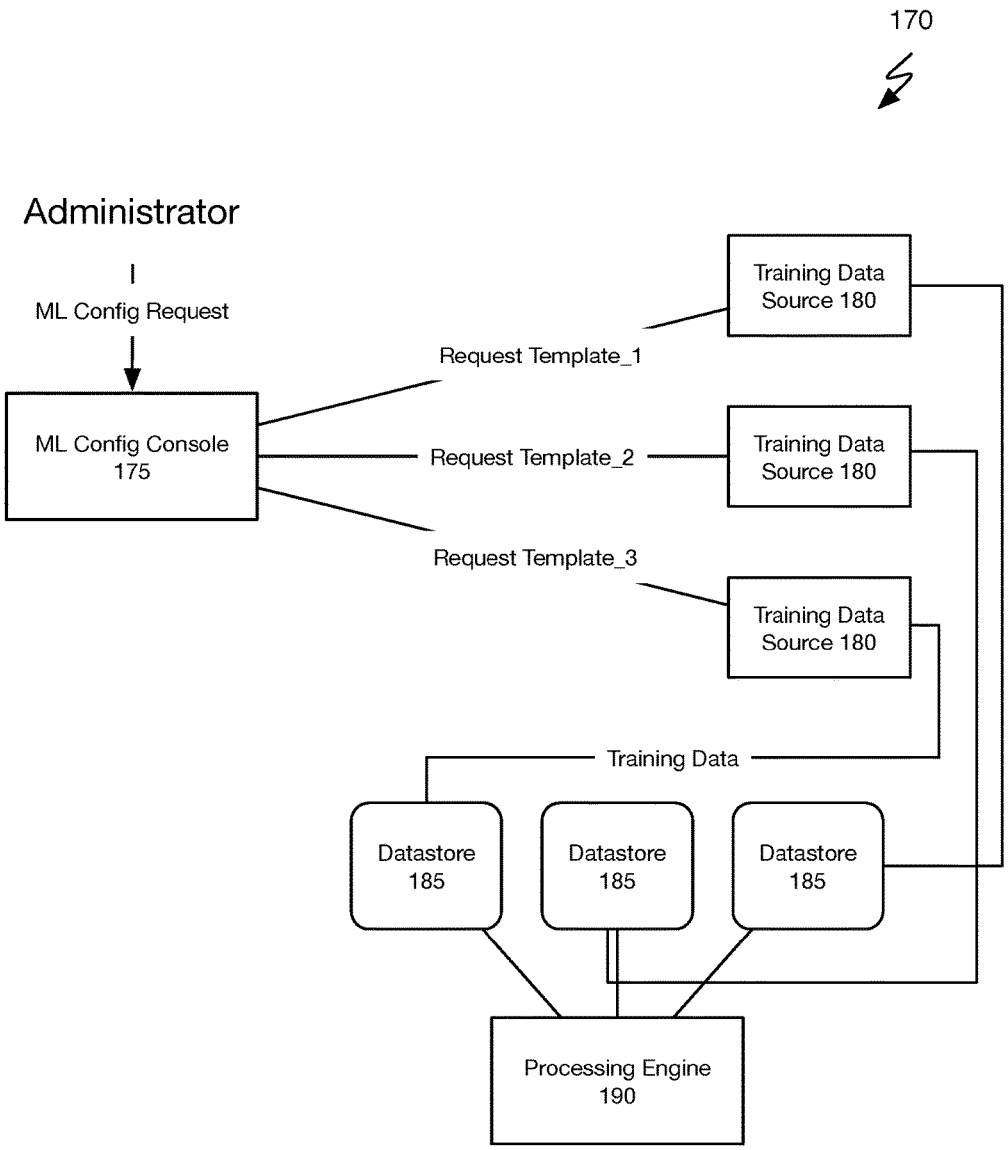
FIG. 1A illustrates a schematic representation of a subsystem of system 100 in accordance with one or more embodiments of the present application.

As shown in FIG. 1A, a subsystem 170 for intelligently training and/or configuring a machine learning model includes a machine learning model configuration and management console 175, a plurality of external training data sources 180, a plurality of datastores 185, and a training data processing engine 190.

The machine learning model configuration and management console 175 preferably functions to provide a user interface that may be in operable communication and/or configurational control of one or more components of the subsystem 170 as well as the artificially intelligent conversational system 100. The machine learning configuration and management console 175 preferably enables an administrator of a machine learning system or environment to perform configuration updates to one or more machine learning models of the machine learning system and/or configure new machine learning models into the machine learning system. The management console 175 may be implemented by one or more private or public (hardware) computing servers and/or computing servers of a distributed computing system (e.g., the cloud).

The plurality of external training data sources 180 preferably include several disparate sources of labeled training data that may be used for training machine learning models. For instance, the plurality of external training data sources 180 may include a crowdsourcing data platform, such as Amazon Mechanical Turk or the like, in which labeled data is sourced from a number of data sources or users into the crowdsourcing data platform.

The plurality of datastores 185 may function to collect and store machine learning training data from the plurality of external training data sources 180.

The training data processing engine 190 may function to process the raw training data samples collected from the plurality of external training data sources 180 into a refined or finished composition or list of training data samples that may be deployed into an operational or live machine learning model of the system 100.

Generally, the system 100 functions to implement the artificial intelligence virtual assistant platform no to enable intelligent and conversational responses by an artificially intelligent virtual assistant to a user query and/or user command input into the system 100. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to take into account the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workboats, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Intelligently and Automatically Training Machine Learning Models

As shown in FIG. 2, a method 200 for intelligently and automatically training machine learning models includes providing a machine learning configuration management console S210, receiving a machine learning configuration request S220, transmitting the machine learning configuration request to training data sources S230, collecting machine learning training data from training data sources S240, processing the machine learning training data S250, and deploying the machine learning training data S260.

The method 200 functions to enable a rapid and intelligent training of one or more machine learning models implemented within an artificially intelligent conversational system described or the like, as described in U.S. patent application Ser. No. 15/797,414 and U.S. patent application Ser. No. 15/821,010, which are both incorporated in their entireties in this application by this reference.

S210, which includes providing a machine learning configuration management console, functions to provide a user interface that may be in operable communication and/or configurational control of one or more components of a machine learning system. The machine learning configuration management console preferably enables an administrator of a machine learning system or environment to perform configuration updates to one or more machine learning models of the machine learning system and/or configure new machine learning models into the machine learning system.

Accordingly, S210 may function to provide the machine learning configuration management console, which preferably includes, a first user interface that enables a monitoring of machine learning models within a machine learning system or environment. Specifically, the first user interface may function to present machine learning status data relating to any or all machine learning models implemented or that will be implemented within the machine learning system.

The machine learning status data of the first user interface may include any type and/or suitable data regarding a current and/or historical configuration of machine learning models of the machine learning system. The machine learning status data may include operational metrics (e.g. utilization metrics) of the machine learning models in the machine learning system including accuracy metrics regarding a level of accuracy in generating predictions and/or classification labels by the machine learning models in the system.

In some implementations, S210 may function to automatically present or provide one or more machine learning configuration user interfaces of the machine learning configuration and management console based on a detection of one or more triggering events associated with status data of one or more of the machine learning models of the machine learning system. In such implementation, the configuration and management console may implement or otherwise, be in operable communication with a monitoring module that functions to monitor status data of the one or more machine learning models of the machine learning system.

Specifically, S210 may function to use the monitoring module to detect one or more predefined triggering events based on the status data of the one or more machine learning models. The one or more predefined triggering events may relate to detected accuracy levels of a machine learning model (e.g., 63% accurate predictions or 91% accurate classification labels, etc.), utilization metrics of a machine learning model (e.g., a normalized utilization value 83% utilization, etc.), size or diversity of machine learning model input training data, version number, dates/times of most recent update, and the like. The monitoring module may function to detect whether status data of the machine learning models is a predefined triggering event based on whether the status data satisfies one or more predetermined thresholds or conditions of the predefined triggering event. For instance, a predefined triggering event for a first machine learning model may include a condition regarding a level of accuracy that should be maintained before a configuration and/or a training update must be performed on the first machine learning model. In such instance, the condition may be that a level of accuracy of 80% must be maintained by the machine learning model and if the level of accuracy of 80% is not satisfied or the level of accuracy of the machine learning model falls below 80%, S210 may function to use the monitoring module to automatically deploy the machine learning configuration and management module with a notification (or alert) indicating or requiring a configuration update to the machine learning model.

As mentioned above, S210 may function to detect any predefined triggering event, including but not limited to detecting a stale version (e.g., an old date/time of last update) of an machine learning model, a low utilization of the machine learning model (possibly indicating poor performance of the machine learning model), and the like.

S220, which includes receiving a machine learning model configuration request, function to receive a machine learning training data request for a pre-existing machine learning model. Preferably, the machine learning training data request is made for updating or reconfiguring an existing machine learning classification model of a machine learning system.

In a preferred embodiment, S220 may function to provide a first user interface (via the machine learning configuration and management console) that may be used to configure a machine learning training data request. S220 may enable an administrator to provide input and/or update configuration parameters for defining the training data request. Preferably, S220 may function to receive a job description or title identifying in one or more terms a nature of the updates to the pre-existing machine learning model. For instance, the job description may indicate "Improving Accuracy of Pizza Ordering Machine Learning Model" or the like. S220 may use the job description or title of the machine learning training data request as metadata when storing results of the machine learning training data request.

Additionally, S220 may enable an administrator to select a pre-existing machine learning model from a pool or a plurality of pre-existing machine learning models of a machine learning system. Thus, S220 functions to receive selection input for a machine learning model that an administrator desires to update or reconfigure. For instance, an administrator may be able to select from a dropdown menu one machine learning model from several machine learning models being implemented in a machine learning system. Once a machine learning model is selected for a training or configuration update, S220 may populate the selected machine learning as input into a first user interface of the machine learning management and configuration console.

Additionally, S220 may function to receive input of training data seed samples for a type or kind of machine learning training data that an administrator desires receiving from the one or more external training data sources in response to the machine learning training data request. The seed samples may include one or more sample queries or sample prompts that may be used as input examples for obtaining machine learning training data from one or more external training data sources. For example, a first training data seed sample may be the query of "How much is a medium pizza?" and a second training data seed sample may be the prompt of "Get me a large pizza." These training data seed samples may be input into a first user interface of the machine learning configuration and management console.

Additionally, or alternatively, S220 may function to receive an identification of one or more external training data sources from which the user desires machine learning training data responses. Accordingly, S220 may function to provide a dropdown menu from which an administrator may select the one or more external training data sources. Alternatively, an administrator may simply provide input identifying the one or more external training data sources.

Additionally, or alternatively, S220 may function to receive a machine learning training data request for a newly defined machine learning model (e.g., a new competency classification model, etc.) of a machine learning system.

S230, which includes transmitting the machine learning configuration request to training data sources, functions to transmit the machine learning training data request to a plurality of external machine learning training data sources. Preferably, each of the plurality of external machine learning training data sources includes and/or may function to generate labeled machine learning data. The labeled machine learning data may typically refer to a group of samples that have been augmented or tagged with one or more labels that generally identifies the sample or otherwise, provides meaningful or informative information about a sample.

Prior to or contemporaneous (at a same time or immediately after) transmitting the machine learning training data request, S230 may function to identify an input template for each of the plurality of external machine learning training data sources. In some embodiments, the input template for an external machine learning training data source defines or outlines a manner for submitting a request for machine learning training data. Accordingly, each of the plurality of external machine learning training data sources may have a different input template, which S230 may function to identify in advance of providing the machine learning training data request.

Once S230 identifies an input template for each respective one of the plurality of external machine learning data sources, S230 may function to convert or transform the input data of the machine learning training data request (provided in S230) according to an input template for each of the plurality of external machine learning training data sources. That is, S230 may use the input data of the single machine learning data request to generate a plurality of completed input templates for submitting the machine learning training data request to each of the plurality of external data sources. Thus, a technical advantage of such configuration and/or process is that an administrator does not have to individually identify and complete disparate input templates for each of the training data sources that the administrator desires to collect machine learning data from. Accordingly, the automatic identification and automatic completion of the disparate input templates by machine learning management and configuration console implemented by S230 significantly expedites a processing time for obtaining training data for configuring or updating a machine learning model.

S240, which includes collecting machine learning training data from training data sources, functions to collect machine learning training data from a plurality of external training data sources in response to the machine learning training data request. In a preferred embodiment, the machine learning training data from an external machine learning training data source comprises a plurality of labeled training samples proliferated based on or using the input of the seed machine learning data samples provided in the machine learning train data request. Accordingly, the machine learning training data returned from the external machine learning training data source may include a large number (e.g., hundreds, thousands, millions, etc.) of labeled data samples that are variants of the seed machine learning data samples. That is, the labeled data samples returned by the external training data source may have the same or similar meanings to one or more of the example user queries and/or one or more examples uses prompts included in the machine learning data request.

Additionally, S240 preferably functions to the machine learning training data from the external training data sources synchronously (in parallel). That is, S240 may function to collect machine learning training data from each of the plurality of external training data sources at a same time without waiting for any one external training data source to provide a completed response to the machine learning training data request.

Additionally, or alternatively, S240 may function to store the collected machine learning training data from each of the plurality of external machine learning training data sources in disparate datastores. That is, S240 may configure a distinct and separate datastore for receiving and storing machine learning training data for each of the plurality of external machine learning training data sources. In this way, specific processing of the machine learning training data may be performed on a per external training data source basis.

Additionally, or alternatively, S240 may function to store the collected machine learning training data from the plurality of external machine learning training data sources in a single datastore. In some embodiments, all machine learning training data may be mixed together or combined. Alternatively, S240 may function to augment the machine learning training data with metadata that identifies from which external machine learning training data source that a label data sample originated from.

Additionally, or alternatively, S240 may function to store the collected machine learning training data in one or more training data queues. The one or more training data queues may function to store the collected machine learning training data for a predefined period. In some embodiments, unless one or more machine learning training data samples are pruned or extracted from the one or more training data queues, S240 may function to automatically load the training data in the one or more training data queues directly into a corresponding or assigned machine learning model. That is, the training data in the queues may be used by the live machine learning system to generate one or more live machine learning classification labels or the like. The predefined period may be set to any suitable period that preferably enables an opportunity for a processing system to evaluate and refine the training data samples from the external training data sources.

Additionally, or alternatively, S240 may implement one or more thresholds for each of the plurality of external training data sources that function to limit an amount of training data that may be collected from each of the plurality of external training data sources. Once S240 detects that a limit or threshold is met for a specific external training data source, S240 may cease collecting or accepting training data from the specific external training data source and may further, signal the specific external training data source to stop transmitting machine learning training data.

The limits or threshold for each of the plurality of external training data sources may be preset (e.g., may be an input value at the configuration console) or dynamic and may be different for each of the plurality of external training data sources. For instance, a training data limit or training data threshold for each of the plurality of external training data sources may be set based on a calculated level of quality assigned to each of the plurality of external training data sources. The level of quality preferably relates to an accuracy of labels generated by the external training data source for each labeled training data sample provided thereby. Thus, a higher calculated level of quality of training data for a given external training data source may enable a higher limit or threshold for receiving labeled training data samples. For instance, a first external training data source may have a high level of quality (judged based on a scale of 0-10, e.g., 8 level of quality or the like) and thus, assigned a high threshold (e.g., 1000 samples or the like). A second external training data source may have a low level of quality (e.g., 2 level of quality, etc.) and thus, assigned a low threshold (e.g., 100 samples or the like).

S250, which includes processing the machine learning training data, functions to assess and refine (if necessary) the machine learning training data samples collected from the plurality of external training data sources. In a preferred embodiment, S250 may function to implement a predefined training data processing algorithm that includes calculating a fit score for each of the training data samples, ranking/rating the training data samples, pruning the training data samples, and the like. The fit score may be any numeric or character value or descriptive value of a predefined range (e.g., 0-100, A-E, 0%-100% low to high, etc.).

The calculated first score for each of the training data samples generally represents how well a given training data samples fits the machine learning model or one or more of the seed training data samples of a training data request. Accordingly, the fit score may be calculated based on the text of the training data samples matching or substantially matching a text or a meaning of a text of a seed sample and the like. Additionally, or alternatively, the fit score may be calculated based on the text of the training data samples matching or substantially matching a text or a meaning of a text of a pre-existing machine learning training data stored in a reference list or database of a machine learning model.

Using the processing algorithm, S250 may function to rate and/or rank each of the training data samples from the external training data sources. Specifically, S250 may function to use the calculated fit score to generate a rating for each of the training data samples. The rating for each training data sample preferably represents how valuable (e.g., based on potential use or appearance by a user or the system) a training data sample may be to a machine learning model.

Accordingly, based on a rating and/or a fit score calculated for each of the training data samples, S250 may function to rank order each of the training data samples in descending or ascending ranking order.

Additionally, or alternatively, S250 may function to apply one or more predefined pruning thresholds to a list of training data samples. Preferably, S250 applies the pruning threshold to the list of training data samples after the training data samples have been rated and/or ranked. The pruning threshold preferably relates to or includes a pruning value, which may be a minimum required rating value (or fit score) and/or minimum required ranking value. For instance, S250 may function to prune from a list of training data samples any training data samples having a fit score or rating below 20 (on a scale of 0-100). Additionally, or alternatively, S250 may function to prune from a list of training data samples any training data sample that is ranked below 80% of candidate training data samples in a list of training data samples. In some embodiments, candidate training data samples that are scheduled to be pruned are flagged and may additionally be sent to a disparate review queue for manual review. In some embodiments, candidate training data samples that have been identified for pruning may be automatically pruned from a list of candidate training data sample after an expiry of a predetermined time period.

S250 may additionally enable an administrator to manually inspect training data samples collected from the plurality of external training data sources and selectively prune undesirable training data samples therefrom. In this regard, S250 may enable an administrator to flag one or more of the training data samples for deletion or inactivation.

S260, which includes deploying the machine learning training data, functions to load the training data samples collected from the plurality of external training data sources into one or more machine learning models of a machine learning system. Preferably, S260 may function to automatically load (e.g., assimilate, integrate, etc.) the training data samples into an active machine learning model only after training data processing algorithm (as described in S250) has been completely applied to a training data sample set. In such embodiment, the training data samples may be added to an existing set of machine learning data samples of a live or operational machine learning model.

In some embodiments, S260 may function to deploy partial training data samples as the training data samples arrive and are processed by the method 200. Thus, in the circumstance when a full list of training data samples has not been provided by one or more external training data sources and/or the one or more external training data sources are slow to provide training data samples, S260 may function to deploy a partial list of training data samples into a live machine learning model.

Additionally, or alternatively, S260 may function to test the performance of a machine learning model based on a deployed set of training data samples. S260 may function to measure one or more operational metrics of the machine learning model and in the case, that the operational metrics of the machine learning have declined since the deployment of the training data set, S260 may function to revert the machine learning model back by removing the training data samples from a reference database of the machine learning mode.

Additionally, or alternatively, S260 may function to simulate how a machine learning model would have performed based on historical operational and/or use data of the machine learning model. In this way, S260 may determine a simulated level of accuracy or other operational metrics of the machine learning model without the risk of deploying the training data samples set into the live machine learning model. Thus, if the training data sample set is poor or bad, S260 may function to reevaluate or discard the training data sample set.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system that rapidly improves a classification accuracy of a machine learning classification model of an artificially intelligent conversational system, the system comprising:

a machine learning configuration and management console that enables an administrator of an artificially intelligent conversational service to configure updates to the machine learning classification model of the artificially intelligent conversational system, wherein the machine learning configuration and management console comprises one or more computer processors and a non-transitory computer-readable medium storing computer instructions then when executed by the one or more computer processors performs the steps of:

detecting that an accuracy level of the machine learning classification model does not satisfy a predetermined threshold;

in response to detecting that the accuracy level does not satisfy the predetermined threshold, automatically generating a notification requiring an update for improving a classification accuracy of the machine learning classification model;

implementing one or more user interfaces that receive input for configuring a machine learning training data request based on the notification, wherein a machine learning training data request includes a plurality of seed machine learning data samples and a request, from the artificially intelligent conversational service, to a plurality of remote third-party training data sources to generate machine learning training data using the plurality of seed machine learning data samples, wherein at least one of the plurality of remote third-party training data sources includes a remote crowdsourcing platform;

transmitting, by the artificially intelligent conversational service, via a network, the machine learning training data request to each of the plurality of
remote third-party training data sources, wherein
each of the plurality of remote third-party training
data sources is different from each other;
collecting and storing the machine learning training
data produced by each of the plurality of remote
third-party training data sources, wherein the
machine learning training data comprises a plurality
of training data samples proliferated based on the
seed machine learning data samples of the machine
learning data request, and wherein each of the plurality of training data samples of the machine learning training data is distinct from each of the plurality
of seed machine learning data samples;
processing the machine learning training data collected
from the plurality of remote training data sources
using a predefined training data processing algorithm, wherein the processing the machine learning
training data includes:
[i] calculating a fit score value for each of the
plurality of training data samples, wherein the fit
score value relates to how well each of the plurality of training data samples fits one or more of
the plurality of seed training data samples of the
training data request,
[ii] after the fit score value is calculated for each
training data sample, applying a pruning threshold
to each of the plurality of training data samples,
wherein the pruning threshold comprises a minimum required fit score value for a given training
data sample, and
[iii] pruning from the plurality of training data
samples any training data sample that does not
satisfy the pruning threshold; and
in response to processing the collected machine learning training data:
[a] simulating a performance of the machine learning
classification model using the plurality of training
data samples remaining after the pruning;
[b] identifying a simulated accuracy level of the
machine learning classification model;
updating the machine learning classification model
based on the simulated accuracy level by training the
machine learning classification model with the plurality of training data samples remaining after the
pruning; and
after the updating, deploying the machine learning
classification model into a live use by the artificially
intelligent conversational system.

2. The system of claim 1, wherein:
the transmitting the machine learning training data request
includes:
identifying an input template for each of the plurality of
external training data sources, wherein the input
template comprises input fields for receiving parameters for generating the machine learning training
data at each of the plurality of remote third-party
training data sources, wherein the input template for
each of the plurality of remote third-party training
data sources is different;
converting input data of the machine learning training
data request to template input for the input template
for each of the plurality of remote third-party training data sources; and
feeding a respective input template having the converted input data of the machine learning training
data request to a respective one of the plurality of
remote third-party training data sources.

3. The system of claim 1, wherein:
the plurality of training data samples comprises a plurality
of labeled training data samples,
the processing the collected machine learning training
data includes:
selectively pruning, by an administrator of the artificially intelligent conversational service, one or more
of the plurality of training data samples from the
plurality of labeled training data samples.

4. The system of claim 1, wherein
candidate training data samples of the plurality of training
data samples that have been identified for pruning may
be automatically pruned from the plurality of training
data samples after an expiry of a predetermined time
period.

5. A method implemented by an artificially intelligent
conversational implement service that rapidly improves a
classification accuracy of a machine learning classification
model, the method comprising:
detecting that an accuracy level of the machine learning
classification model does not satisfy a predetermined
threshold;
in response to detecting that the accuracy level does not
satisfy the predetermined threshold, automatically generating a notification requiring an update for improving
a classification accuracy of the machine learning classification model;
configuring a machine learning (ML) training data request
based on the notification, wherein a machine learning
training data request includes a plurality of seed
machine learning data samples and a request, from the
artificially intelligent conversational service, to a plurality of remote third-party training data sources to
generate machine learning training data using the plurality of seed machine learning data samples, wherein
at least one of the plurality of remote third-party
training data sources includes a remote crowdsourcing
platform;
transmitting, by the artificially intelligent conversational
implement service, via a network, the machine learning
training data request to each of the plurality of remote
third-party training data sources, wherein each of the
plurality of remote third-party training data sources is
different;
collecting and storing the machine learning training data
produced by each of the plurality of remote third-party
training data sources, wherein the machine learning
training data comprises a plurality of training data
samples proliferated based on the seed machine learning data samples of the machine learning data request,
and wherein each of the plurality of training data
samples of the machine learning training data is distinct
from each of the plurality of seed machine learning data
samples;
processing the machine learning training data collected
from the plurality of remote training data sources using
a predefined training data processing algorithm,
wherein the processing the machine learning training
data includes:
[i] calculating a fit score value for each of the plurality
of training data samples, wherein the fit score value
relates to how well each of the plurality of training
data samples fits one or more of the plurality of seed
training data samples of the training data request,

[ii] after the fit score value is calculated for each training data sample, applying a pruning threshold to each of the plurality of training data samples, wherein the pruning threshold comprises a minimum required fit score value for a given training data sample, and

[iii] pruning from the plurality of training data samples any training data sample that does not satisfy the pruning threshold; and in response to processing the collected machine learning training data:

[a] simulating a performance of the machine learning classification model using the plurality of training data samples remaining after the pruning;

[b] identifying a simulated accuracy level of the machine learning classification model;

updating the machine learning classification model based on the simulated accuracy level by training the machine learning classification model with the plurality of training data samples remaining after the pruning; and after the updating, deploying the machine learning classification model into a live use by the artificially intelligent conversational system.

6. The method of claim 5, wherein:

configuring the training data request includes:

a selection of the machine learning classification model from a pool of pre-existing machine learning classification models of the artificially intelligent conversation system; and one or more of the plurality of seed machine learning data samples comprising one or more example user queries and/or one or more example user prompts.

7. The method of claim 6, further comprising:

prior to the transmitting the machine learning training data request, identifying an input template for each of the plurality of remote third-party training data sources; and reformatting input of the machine learning training data request to input for the input template for each of the plurality of remote third-party training data sources.

8. The method of claim 5, wherein:

configuring the machine learning training data request includes:

an identification of a new machine learning classification task desired for the machine learning classification model; and generating one or more seed examples comprising one or more example user queries and/or one or more example user prompts for the new machine learning classification task.

9. The method of claim 5, wherein:

the collecting the machine learning training data from each of the plurality of remote third-party training data sources is performed synchronously.

10. The method of claim 5, wherein:

storing the machine learning training data includes storing a subset of the machine learning training data from each of the plurality of external training data sources into distinct datastore for each respective one of the plurality of remote third-party training data sources.

11. The method of claim 5, wherein:

the machine learning classification model comprising a competency classification machine learning model, wherein the competency classification machine learning model is configured to generate a plurality of distinct competency classification labels, each of the plurality of distinct competency classification labels corresponds to one competency of a plurality of areas of competencies of an artificially intelligent virtual assistant, and a competency relates to a subject area of comprehension or aptitude of the artificially intelligent conversational system for which the artificially intelligent conversational system can interact with or provide a response to user input data.

12. The method of claim 11, wherein:

the competency classification machine learning model comprises a single competency classification deep machine learning algorithm that is trained to detect each of the plurality of distinct competency classification labels, and generating the competency classification label for the user input data includes selecting the competency classification label having a highest probability of matching an intent of the user input data.

13. The method of claim 11, wherein:

the competency classification machine learning model comprises an ensemble of competency classification deep machine learning algorithms, wherein each competency classification deep machine learning algorithm of the ensemble is trained to detect a distinct competency classification label of the plurality of distinct competency classification labels, and generating the competency classification label for the user input data includes selecting the competency classification label having a highest probability of matching an intent of the user input query.

* * * * *